United States Patent
Le Rolland et al.

(10) Patent No.: US 11,610,006 B2
(45) Date of Patent: Mar. 21, 2023

(54) METHOD TO CONTROL THE DISPLAY OF AT LEAST ONE CONTENT ON A SCREEN

(71) Applicant: NAGRAVISION S.A., Cheseaux-sur-Lausanne (CH)

(72) Inventors: Nathalie Le Rolland, Issy-les-Moulineaux (FR); Pierre Slawny, Issy-les-Moulineaux (FR); Antoine Burckard, Montigny le Bretonneux (FR); David Bouteruche, Issy-les-Moulineaux (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 53 days.

(21) Appl. No.: 16/183,040

(22) Filed: Nov. 7, 2018

(65) Prior Publication Data
US 2019/0147186 A1    May 16, 2019

(30) Foreign Application Priority Data
Nov. 13, 2017  (EP) .................................... 17201308

(51) Int. Cl.
*G06F 21/60* (2013.01)
*H04N 21/441* (2011.01)
(Continued)

(52) U.S. Cl.
CPC ............ *G06F 21/604* (2013.01); *G06F 21/32* (2013.01); *G06F 21/6245* (2013.01);
(Continued)

(58) Field of Classification Search
CPC .... G06F 21/604; G06F 21/6281; G06F 21/32; G06F 21/6245; H04N 21/441; H04N 21/454; H04N 21/44218; H04N 21/4223
See application file for complete search history.

(56) References Cited

U.S. PATENT DOCUMENTS 7,131,132 B1 * 10/2006 Gehlot ..................... G07C 9/37
                                                                725/10
8,489,887 B1    7/2013 Newman et al.
(Continued)

OTHER PUBLICATIONS

Peter et al., "Improving ATM security via face recognition," 2011 3rd International Conference on Electronics Computer Technology, 2011, pp. 373-376, doi: 10.1109/ICECTECH.2011.5942118.*
(Continued)

*Primary Examiner* — Victor Lesniewski
(74) *Attorney, Agent, or Firm* — Oblon, McClelland, Maier & Neustadt, L.L.P.

(57) ABSTRACT

A method to control the display of content on a screen connected to a processing platform, the content including access conditions, and the method including acquiring an image within a sensitive area, the sensitive area being an area within which content displayed on the screen would be within the field of view of an observer placed thereat, detecting a number of potential observers within the sensitive area, acquiring a number of credentials from the detected observers within the sensitive area, if the number of credentials is below the number of detected observers, disabling the display of the content, if the number of credentials equal the number of detected observers, comparing each credential with the access conditions and if all credentials match the access conditions, enabling display of the content.

7 Claims, 3 Drawing Sheets

(51) Int. Cl.
    *H04N 21/454*     (2011.01)
    *H04N 21/442*     (2011.01)
    *H04N 21/4223*     (2011.01)
    *G06F 21/62*     (2013.01)
    *G06F 21/32*     (2013.01)

(52) U.S. Cl.
    CPC ..... *G06F 21/6281* (2013.01); *H04N 21/4223* (2013.01); *H04N 21/441* (2013.01); *H04N 21/44218* (2013.01); *H04N 21/454* (2013.01)

(56) References Cited

U.S. PATENT DOCUMENTS

| | | | | |
|---|---|---|---|---|
| 8,737,965 | B2* | 5/2014 | McCown | G06F 21/552 |
| | | | | 455/411 |
| 9,007,473 | B1* | 4/2015 | Worley, III | G06K 9/00201 |
| | | | | 348/211.11 |
| 9,100,694 | B1* | 8/2015 | Chandel | H04N 21/443 |
| 9,898,610 | B1* | 2/2018 | Hadsall | G06K 9/20 |
| 10,231,128 | B1* | 3/2019 | Ziraknejad | H04L 9/0825 |
| 2009/0141895 | A1 | 6/2009 | Anderson et al. | |
| 2010/0124363 | A1* | 5/2010 | Ek | G06F 21/6245 |
| | | | | 382/118 |
| 2010/0205667 | A1* | 8/2010 | Anderson | G06F 3/017 |
| | | | | 726/19 |
| 2012/0260307 | A1 | 10/2012 | Sambamurthy et al. | |
| 2013/0205367 | A1 | 8/2013 | Sambamurthy et al. | |
| 2013/0205410 | A1 | 8/2013 | Sambamurthy et al. | |
| 2013/0219463 | A1 | 8/2013 | Sambamurthy et al. | |
| 2013/0219518 | A1 | 8/2013 | Sambamurthy et al. | |
| 2013/0305337 | A1 | 11/2013 | Newman et al. | |
| 2014/0013437 | A1 | 1/2014 | Anderson et al. | |
| 2014/0047560 | A1 | 2/2014 | Meyer et al. | |
| 2014/0068740 | A1* | 3/2014 | LeCun | H04L 63/0861 |
| | | | | 726/7 |
| 2014/0147020 | A1* | 5/2014 | Baldwin | H04N 21/4223 |
| | | | | 382/118 |
| 2014/0198958 | A1 | 7/2014 | Nathan et al. | |
| 2015/0249688 | A1 | 9/2015 | Sambamurthy et al. | |
| 2016/0085978 | A1 | 3/2016 | Meyer et al. | |
| 2016/0127363 | A1* | 5/2016 | Vea Orte | G07C 9/37 |
| | | | | 726/4 |
| 2016/0343187 | A1* | 11/2016 | Trani | H01Q 9/0407 |
| 2016/0371504 | A1 | 12/2016 | Huang et al. | |
| 2017/0091466 | A1 | 3/2017 | Meyer et al. | |
| 2017/0255786 | A1* | 9/2017 | Krishnamurthi | G06F 3/167 |
| 2019/0065790 | A1* | 2/2019 | Jones | G06F 21/6218 |
| 2019/0138740 | A1* | 5/2019 | Ricknas | G02F 1/1393 |
| 2020/0184088 | A1* | 6/2020 | Waneck | G06F 21/83 |

OTHER PUBLICATIONS

Extended European Search Report dated May 25, 2018 in European application 17201308.8, filed on Nov. 13, 2017 (with Written Opinion).

\* cited by examiner

METHOD TO CONTROL THE DISPLAY OF AT LEAST ONE CONTENT ON A SCREEN

INTRODUCTION

Great care is taken to protect the leakage of information stored in electronic format. Encryption is one of the main aspects of the security along with the access conditions defining the conditions to access to content.

However, the content should be exploited and in particular displayed on a screen. A content in the sense of the present description is a content that can be displayed on a screen such as an image, a text document, a spreadsheet, a Power-point, a video etc. With the content, access conditions are defined and verified each time the content is requested for display.

Once displayed, the content is readable by any person having the display in his or her field of view. A first solution has been proposed using a screen filter. The tiny blinds, or micro louver, built into the filter allow light to pass through straight on and not on the sides. This makes it so you can see what's on your screen, but the person next to you can't. Some laptops even come with them built in now, where you can turn the filter effect on and off at will.

This solution has the drawback that firstly the screen cannot be seen by persons sideway, which is in some instances desirable, and secondly can still be seen by someone standing just behind the authorized person.

SUMMARY

To provide a more flexible manner to handle the protection of content on a screen, there is proposed a method to control the display of at least one content on a screen connected to a processing platform, said content comprising access conditions, said method comprising:
- acquiring an image of a sensitive area, the sensitive area being an area in which content displayed on the screen would be within the field of view of an observer placed thereat,
- detecting on the image a number of potential observers within the sensitive area,
- acquiring a number of credentials from the detected observers within the sensitive area,
- if the number of credentials is below the number of detected observers, disabling the display of the content,
- if the number of credentials equals the number of detected observers, comparing each credential with the access conditions and if all credentials match the access conditions, enabling display of the content.

For the purpose of the present disclosure, it is worth mentioning that an observer is any being which is capable of visual perception, but is usually taken to be a person. The sensitive area would be an area around the screen in which the person would be able to read, or otherwise interpret, content displayed on the screen.

One key aspect of the present description is the detection of all persons having a possibility to watch the screen. For that purpose, an image is acquired by an image acquisition device, this image containing the persons located in the sensitive area of the screen.

A processing platform, connected to the screen, compares the number of persons detected in the image with the number of person having been identified, verifies the credentials of the persons identified, where such credentials exist. If all credentials match the access conditions attached to the content, the display of the content is enabled. Otherwise, the display is blocked.

BRIEF DESCRIPTION OF THE FIGURES

The present description will be better understood thanks to the figures attached in which.

DESCRIPTION

Figure 1:
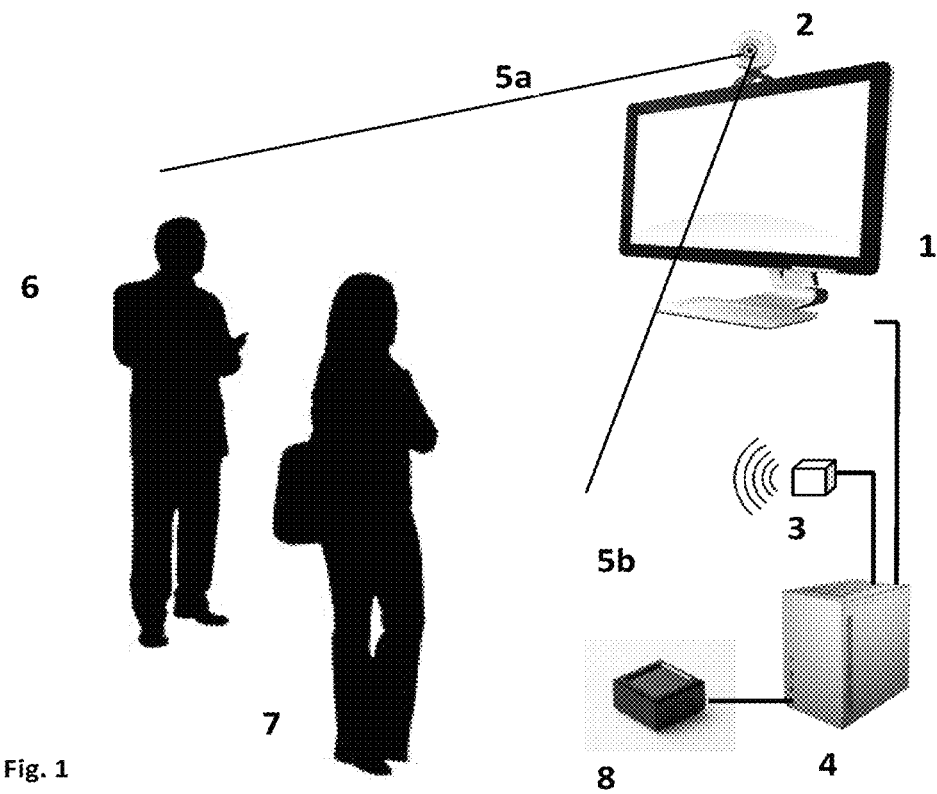
FIG. 1 illustrates the system to detect and verify the right to a content

The system of the present description comprises at least one screen 1, an image acquisition device 2 and a processing platform 4 as illustrated in FIG. 1. The image acquisition device 2 is preferably placed in front of the screen such that its line of sight is perpendicular to the display surface of the screen 1. The image acquisition device is in charge of acquiring an image of an area which includes a sensitive area in which a person is able to read the content on the screen. A person finding himself or herself in the sensitive area would be able to read or otherwise interpret content displayed on the screen.

The processing platform 4 is used, among others, to control the display of content. This content contains access conditions. These access conditions can be of different forms. According to a first embodiment, it could be a list of authorized persons, identified by a personal identifier. According to a second embodiment, it can be a security level, such as security level 3 which means "secret". The level 4 could be "top secret". Any person having the security level equal or higher than the security level defined in the access conditions is allowed to view the content.

Before, and as long as the content is sent to the display, the processing platform 4 triggers the acquisition of an image with the image acquisition device 2. The image is processed in order to determine the number of persons in the sensitive area. Various methods exist to detect a face within an image. One of these methods analyses the image in order to detect the eyes of a person. In FIG. 1, two persons are detected within the sensitive area defined by the lines 5a and 5b. At that time, the processing platform is expecting to check the credentials of two persons. In the present description, we use the term "detected" for the process of detecting a person on an image without knowing who the person is. The term "identified" is used for the process of determining who the detected person is. The process is repeated while the content is displayed on the screen so as to detect any change in the audience.

According to a first embodiment, the wireless communication device 3 is a very short range communication system, e.g. a couple of centimeters, and a dialog box opens on the screen to request the identifiers or credentials of two persons. Identifiers only are first provided, then credentials are retrieved and checked, or credentials are directly provided and checked. The detected persons are requested to present their identifiers or credentials. This can be achieved by presenting a personal data carrier close to the wireless communication device by each detected person.

The identifiers or credentials are then read by the processing platform via the wireless communication device and the credentials are verified. In the case where the access condition is a list of authorized persons, the processing platform compares the personal identifier of each person with the personal identifiers contained in the list. If a match is found, the person is authorized. If all detected persons have presented a data carrier having a personal identifier contained in the authorized list, the content is released for display.

In the case where the access condition is a security level, the credentials present in the data carrier, or retrieved according to the identifier present in the data carrier, comprise the security level of the person. This is compared, for each person with the minimal security level, and access to the content is authorized if all identified persons have a security level at least equal to the security level of the access condition. The data carrier of a person comprises a personal identifier and possibly the security level of said person. This personal identifier is used to avoid that the same data carrier is presented more than once to the wireless communication device. The processing platform, when expecting the presentation of two data carriers, for the detection of two persons, accepts a second data carrier if the personal identifier of the second person is different.

According to a second embodiment, the wireless communication device 3 is a medium range communication system, e.g. up to 3 meters. The wireless communication device can then establish a communication channel with the data carrier of each person in front of the screen. The same verification as explained above is carried out. The difference with the previous embodiment is the absence of request for each person to come close to the communication device to receive the credential carried by the persons.

According to a third embodiment, the identification of the persons is carried out by the processing of a fingerprint. A fingerprint reader 8 is connected to the processing platform and the fingerprint is acquired of each person detected in the image acquired by the image acquisition device. The processing platform comprises a reference database and processing capabilities to compare an acquired fingerprint with reference fingerprints of authorized persons. Once the person has been identified, i.e. its personal identifier established, this personal identifier can be used directly if the access conditions are a list of authorized persons, or indirectly if the access conditions are a security level. In the latter case, a local or a remote database is queried to determine the security level of the identified person.

According to a fourth embodiment, the image acquired by the image acquisition device is used to identify the face of each person. The image is cropped to extract the portion related to each face. The processing platform comprises a reference database and processing capabilities to compare an acquired image portion comprising a face with reference faces of authorized persons. Once the person has been identified, this person's identifier can be used directly if the access conditions are a list of authorized persons, or indirectly if the access conditions are a security level. In the latter case, a local or remote database is queried to determine the security level of the identified person.

The embodiments described above can be combined. For example, once the number of persons has been determined from the analysis of the image taken by the image acquisition device, the credentials may be acquired with the medium range, or short range, communication system for each person. An analysis of the acquired image is carried out to determine the identity of the person and therefore a comparison can be made by the processing platform between the identified persons and the received credentials. The analysis of the face detected on the image allows obtaining a person's identifier. The same person's identifier should be part of the credentials transferred from the data carrier of this person. In the negative event, a message may be displayed on the screen and the access to the content is blocked.

Figure 2:
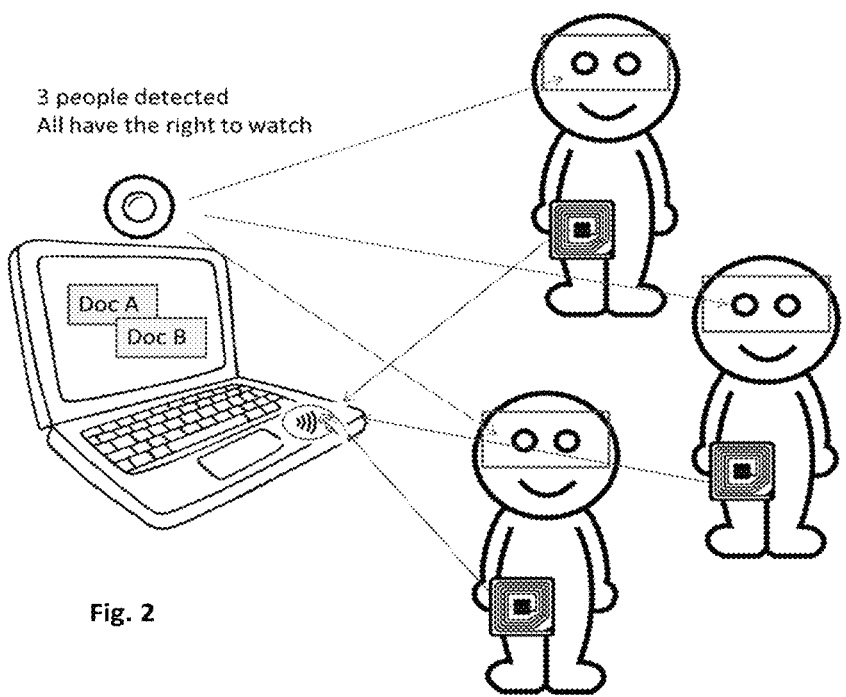
FIG. 2 illustrates an example with three authorized persons

FIG. 2 illustrates the case of the display of two contents on a screen. From the scenario illustrated in FIG. 1, another person enters the sensitive area. It is to be noted that the processing platform constantly, or otherwise repeatedly, requests the acquisition of an image by the image acquisition device and determines whether the number of persons has changed.

In the case where the number of persons does change, to a higher number for example, then the processing platform checks the credential of this new person.

According to the first embodiment, the content may be temporarily removed from the screen and replaced by a request to enter the new credentials. The new person then comes close to the wireless communication device or the fingerprint reader and the credentials are transferred into the processing platform. If the new credentials match the access conditions, then the content is released for display.

In the second embodiment, the processing platform, via the wireless communication device, tries to obtain the credentials of the new comer. If the transfer is successful and the credentials match the access conditions, the content is allowed to the screen.

In the case where the number of persons decreases, the processing platform continues to allow the content to be displayed. When the number of persons increases, to the number previously detected, the processing platform can react according to two scenarios. The first one is to consider that the same person has temporarily disappeared, for example the person has moved within the group and the face was temporarily hidden by another person. Then the content continues to be enabled. In the other scenario, the processing platform compares the previous image, before the number of persons decreased, in order to determine if the same face has reappeared. In the positive event, the content continues to be enabled. In the negative event, the content is disabled and the processing platform requests the credentials of this new person.

Figure 3:
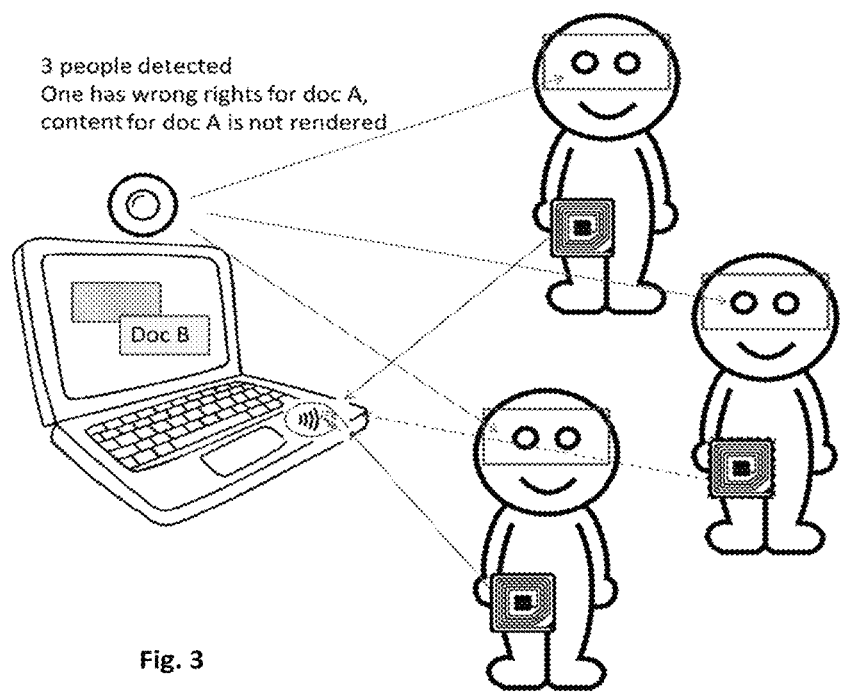
FIG. 3 illustrates an example with one person being not allowed to access a content

The screen can display more than one content. Each content has its own access conditions. Content A and content B are displayed and two persons are watching the contents. In FIG. 3, a third person is detected by the image acquisition device. The credentials of the third person are acquired and compared to the access conditions of content A and content B. In the case illustrated by the FIG. 3, content A contains access conditions that the third person does not meet. Content A is then blocked from being displayed and only content B is displayed.

The credentials or the identifier stored in a data carrier of a person are preferably secured by suitable security procedures. A first manner to secure the credentials or the identifier is the use a signature. The user's credentials or identifier comprise a payload and a signature. The signature is generated at a reference entity and the payload is signed by a private key of the reference entity. The credentials or the identifier are then transferred to the processing platform via the wireless communication device including the signature. The processing platform comprises the public key of the reference entity and uses the public key to decrypt the signature. The decrypted signature is then compared with the payload. In case of a difference, the credentials or the identifier are rejected as not valid.

A second manner to secure the credentials or the identifier is to encrypt them. The processing platform and the data carriers share the same symmetric key K. Once the credentials or the identifier have been received by the processing platform, the symmetric key K is used to decrypt the credentials or the identifier and the decrypted content is used for the comparison with the access conditions.

According to one embodiment, the processing platform is connected to an authorization center in charge of processing the authorization to access a content. The credentials or the identifiers received via the wireless communication device are transferred to the authorization center together with at least the access conditions. It is to be noted that the credentials or the identifiers could be encrypted and the processing platform does not have the capability to decrypt the credentials or the identifiers. The authorization center firstly verifies, and/or decrypts the credentials for example using a signature as explained above and compares the verified credentials with the access conditions. The result of the comparison is transmitted to the processing platform to enable or disable access to the content.

The authorization center can play the role of a remote processing platform in the case where the credentials are in the form of a fingerprint or of a face, as described above. The processing platform sends the acquired image, or part thereof, or the acquired fingerprint to the remote processing platform and in return, receives a personal identifier.

The user's data carrier can have the form of a mobile phone with short rage communication capabilities such as NFC or Bluetooth. The access conditions of a content can comprise the list of the authorized telephone numbers or the IMEI of the mobile phone.

According to a particular embodiment, the image acquisition device is mounted on the screen as illustrated on the FIG. 1 or is part of the screen such as the integrated camera of a laptop. In the case where the screen is moved, the sensitive area of the screen is therefore always aligned with the acquisition area of the image acquisition device.

Figure 4:
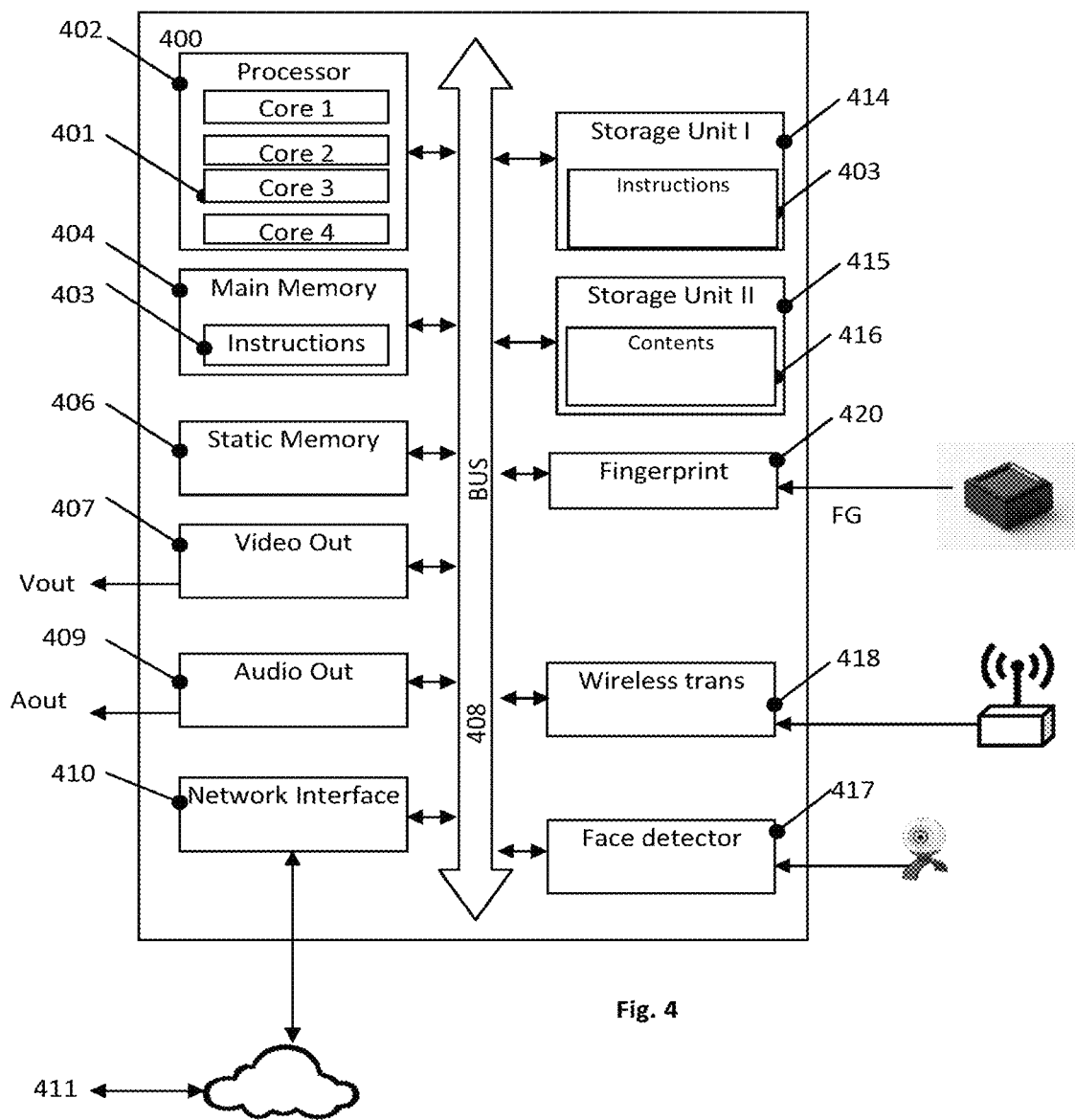
FIG. 4 illustrates an example of a processing platform.

As shown in FIG. 4, a block diagram illustrating components of a Processing Platform 400, according to some example embodiments, is able to read instructions from a machine-readable medium, e.g., a machine-readable storage medium, and perform any one or more of the methodologies discussed herein. Specifically, FIG. 4 shows a diagrammatic representation of the Processing Platform 400 in the example form of a computer system and within which instructions 403, e.g., software, a program, an application, an applet, an app, or other executable code, for causing the Processing Platform 400 to perform any one or more of the methodologies discussed herein may be executed. In alternative embodiments, the Processing Platform 400 operates as a standalone device or may be connected, e.g., networked to other machines. In a networked deployment, the Processing Platform 400 may operate in the capacity of a server machine or a client machine in a server-client network environment, or as a peer machine in a peer-to-peer, or distributed network environment. The processing Platform 400 may be a server computer, a client computer, a personal computer (PC), a network router, a network switch, a network bridge, or any machine capable of executing the instructions 403, sequentially or otherwise, that specify actions to be taken by that machine. It is to be noted that this list is not complete and any other device with functions like the ones of the processing platform may be used.

Further, while only a single machine is illustrated, the term "machine" shall also be taken to include a collection of machines that individually or jointly execute the instructions 403 to perform any one or more of the methodologies discussed herein. An example of a machine carrying out the present invention can be a smartphone or a tablet, thus comprising the Processing Platform 400 and the Screen 1.

The Processing Platform 400 may include a processor 402, e.g., a central processing unit (CPU), a digital signal processor (DSP), an application specific integrated circuit (ASIC), or any suitable combination thereof, a main memory 404, and a static memory 406, which are configured to communicate with each other via a bus 408. The processor 402 can be a single chip or a multi-core processor Core 1 . . . Core 4. The Processing Platform 400 may further include a Network Interface 410 in communication with other external devices. The network interface 410 can be used to communicate with a remote processing platform.

The Processing Platform 400 may include a first storage unit I 414 on which is stored the instructions 403 embodying any one or more of the methodologies or functions described herein. The instructions 403 may also reside, completely or at least partially, within the main memory 404, within the processor 402 e.g., within the processor's cache memory, or both, during execution thereof by the Processing Platform 400. Accordingly, the main memory 404 and the processor 402 may be considered as machine-readable media. The Processing Platform 400 further contain a second storage unit II 415 on which is stored the contents 416. One example of the content can be a Word document or a Power-Point presentation or an mp3 file. This memory can also contain the access conditions related to the contents. The content can be also fetched to a remote server via the Network Interface and stored temporarily into the Storage Unit II, in view of displaying the content.

The Processing Platform 400 may comprise a Video Out module 407 to drive the screen connected to the output Vout and an Audio Out module 409 to render audio signal, if any, to the audio output Aout. The Processing Platform 400 may comprise a Face detector module 417 to receive the image acquired from the camera and in charge of detecting the faces. The Face detector 417 is in charge of analyzing the image, detecting the faces on an image and informing the other modules of the number of faces detected, i.e. the number of persons. In a particular embodiment, the face detector is also in charge of identifying the detected faces. Reference faces can be stored in the Storage Unit II for example. The Processing Platform 400 comprises a wireless communication device 418 to receive the credentials or the identifiers of the persons in the sensitive area. The credentials or identifiers are then processed by the Processor 400 and compared with the access conditions attached to the content to be displayed.

The Processing Platform 400 may comprise a Fingerprint reader 420 to receive the fingerprint of the persons within the sensitive area. The fingerprints are then processed by the Processor 400 and compared with reference fingerprints stored in the Storage Unit II. Once the person has been identified, the access conditions attached to the content is checked to determine if this person is allowed to the content. As explained above, the fingerprint can be transmitted to a remote processing platform comprising the reference fingerprints and the identification of the person is transmitted back to the Processing Platform 400. Instead or in addition to the person's identifier, the remote processing platform can transmit the security level of the identified person.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the storage unit 414, 415 is shown in an example embodiment to be a single medium, the term "storage unit" should be taken to include a single medium or multiple media (e.g., a centralized or distributed database, or associated caches and servers) able to store instructions.

The instructions 403 may further be transmitted or received over a communications network 411 using a transmission medium via the network interface device 410 and utilizing any one of a number of well-known transfer protocols, e.g., HTTP. Examples of communication networks include a local area network (LAN), a wide area network (WAN), the Internet, mobile telephone networks, POTS networks, and wireless data networks, e.g., WiFi and WiMAX networks. The term "transmission medium" shall be taken to include any intangible medium that is capable of storing, encoding, or carrying instructions for execution by the machine 400, and includes digital or analog communications signals or other intangible medium to facilitate communication of such software. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The invention claimed is:

1. A method to control a display of at least one content on a screen connected to a processing platform, said content comprising access conditions, said method comprising:
    acquiring an image of a sensitive area, the sensitive area being an area in which content displayed on the screen is within the field of view of an observer placed thereat,
    detecting on the image a number of potential observers within the sensitive area, the number of potential observers detected being at least two,
    requesting credentials from each of the potential observers detected within the sensitive area, and acquiring a number of credentials from the potential observers detected within the sensitive area, the acquisition of the credentials comprising at least one of:
        receiving, via a wireless communication device, an identifier of a respective detected observer stored in a data carrier carried by the respective detected observer, and retrieving the credentials of the respective detected observer using the received identifier, and
        receiving, via the wireless communication device, the credentials of the respective detected observer stored in the data carrier carried by the respective detected observer;
    comparing the number of credentials acquired with the number of potential observers, and depending on a result of the comparing:
        if the number of credentials is below the number of potential observers detected, disabling the display of the at least one content,
        if the number of credentials is equal to the number of potential observers detected, comparing each credential with the access conditions and if all credentials match the access conditions, enabling display of the at least one content, otherwise disabling display of the content,
wherein the method further comprises:
    repeatedly requesting, by the processing platform, acquisition of another image of the sensitive area, and determining whether the number of potential observers detected in the other image has changed,
    when the number of potential observers detected in the other image has decreased, continuing to enable display of the at least one content,
    when the number of potential observers detected in the other image increases to a previously-detected number of potential observers, comparing a previous image taken prior to a decrease in the number of potential observers in order to determine whether a same face has reappeared,
    if the same face has reappeared, continuing to enable display of the at least one content, and
    if a different face has appeared that was not present in the previous image, disabling display of the at least one content and requesting credentials from an observer corresponding to the different face.

2. The method of claim 1, wherein the access conditions are a list of authorized observers in the form of a list of identifiers corresponding to the authorized observers, and the credentials are identifiers corresponding to the potential observers.

3. The method of claim 1, wherein the access conditions include a security level, the credentials include security levels corresponding to the potential observers, and the access to the content is granted if the security levels of all the potential observers are greater than or equal to the security level included in the access conditions.

4. The method of claim 1, wherein the access conditions include a security level, the method further comprising:
    for each of the potential observers:
        querying a local or remote database using the identifier, and
        receiving in return credentials in the form of a security level of said corresponding observer,
    wherein the access to the content is granted if the security level of all potential observers are greater than or equal to the security level included in the access conditions.

5. The method of claim 1, wherein the identifier or the credential transmitted to the wireless communication device is authenticated by a signature, said signature being verified by the processing platform before the identifier or the credential is accepted.

6. The method of claim 1, wherein the identifier or the credential transmitted to the wireless communication device is encrypted by a secret key, said credentials being decrypted with the secret key by the processing platform before the identifier or the credential being processed.

7. A system to control the display of content, said system comprising:
    a screen configured to display the content;
    an image acquisition device;
    a wireless communication device; and
    a processing platform connected to the screen and configured to:
        acquire an image of a sensitive area, the sensitive area being an area within which content displayed on the screen would be within the field of view of an observer placed thereat, detect a number of potential observers within the sensitive area on the acquired image, the number of potential observers detected being at least two, request credentials from each of the potential observers detected in the sensitive area, and acquire a number of credentials from the potential observers detected within the sensitive area, in the acquisition of the credentials the processing platform being further configured to at least one of:
  receive, via a wireless communication device, an identifier of a respective detected observer stored in a data carrier carried by the respective detected observer, and retrieve the credentials of the respective detected observer using the received identifier, and
  receive, via the wireless communication device, the credentials of the respective detected observer stored in the data carrier by the respective detected observer;

compare the number of credentials acquired with the number of potential observers detected, and depending on a result of the comparison:
  if the number of credentials is below the number of potential observers detected, disable display of the content,
  if the number of credentials is equal to the number of potential observers detected, compare each credential with the access conditions and if all credentials match the access conditions, enable the display of the content, otherwise disable display of the content, wherein the processing platform is further configured to:

repeatedly request acquisition of another image of the sensitive area, and determine whether the number of potential observers detected in the other image has changed, when the number of potential observers detected in the other image has decreased, continue to enable display of the content, when the number of potential observers detected in the other image increases to a previously-detected number of potential observers, compare a previous image taken prior to a decrease in the number of potential observers in order to determine whether a same face has reappeared, if the same face has reappeared, continue to enable display of the at least one content, and if a different face has appeared that was not present in the previous image, disable display of the at least one content and requesting credentials from an observer corresponding to the different face.

* * * * *